United States Patent
Kim

(10) Patent No.: US 7,964,007 B2
(45) Date of Patent: Jun. 21, 2011

(54) FILTER BAG FOR USE IN DUST COLLECTOR

(75) Inventor: Yong Chul Kim, Ansan (KR)

(73) Assignees: Sinsungplant Co., Ltd., Ansan (KR); Yong Chul Kim, Ansan (KR); KC Green Holdings Co., Ltd., Seoul (KR)

( * ) Notice: Subject to any disclaimer, the term of this patent is extended or adjusted under 35 U.S.C. 154(b) by 0 days.

(21) Appl. No.: 12/296,109

(22) PCT Filed: Apr. 16, 2008

(86) PCT No.: PCT/KR2008/002139
§ 371 (c)(1),
(2), (4) Date: Oct. 5, 2008

(87) PCT Pub. No.: WO2009/002010
PCT Pub. Date: Dec. 31, 2008

(65) Prior Publication Data
US 2010/0162672 A1   Jul. 1, 2010

(30) Foreign Application Priority Data
Jun. 22, 2007 (KR) .................. 10-2007-0061748

(51) Int. Cl.
*B01D 46/04* (2006.01)
(52) U.S. Cl. ............... 55/378; 55/379; 55/380; 55/382
(58) Field of Classification Search ............ 55/379, 55/380, 283, 302, 341.1, 382, 378; 95/279, 95/280
See application file for complete search history.

(56) References Cited

U.S. PATENT DOCUMENTS

| | | | | |
|---|---|---|---|---|
| 3,826,066 A | * | 7/1974 | Higgins | 55/379 |
| 4,289,511 A | * | 9/1981 | Johnson, Jr. | 55/302 |
| 4,539,025 A | * | 9/1985 | Ciliberti et al. | 55/302 |
| 4,738,696 A | * | 4/1988 | Staffeld | 55/341.1 |
| 5,171,339 A | * | 12/1992 | Forsten | 55/379 |
| 5,178,652 A | * | 1/1993 | Huttlin | 95/279 |
| 5,288,299 A | * | 2/1994 | Yoshida et al. | 55/302 |

* cited by examiner

*Primary Examiner* — Duane Smith
*Assistant Examiner* — Minh-Chau Pham
(74) *Attorney, Agent, or Firm* — Edwards Angell Palmer & Dodge LLP; Kongsik Kim

(57) ABSTRACT

Provided is a filter bag for use in a dust collector which increases a filter area greatly even with a simple structure, and which makes size of the dust collector compact, to thereby reduce an installation area of the dust collector, and uniformly distributing an air pressure to thereby increase a dust removal effect as well as to enable a worker to easily manufacture the dust collector regardless of a quality of a material to thus provide a wide application range. The filter bag includes: a cylindrical filter cloth (32) which is supported by a filter cage (31); and a venturi tube (35) which is combined with the upper end of the filter cage 31, and forms an air supply path so that pressurized air is supplied to the inside of the filter cloth (32), wherein the filter cloth (32) comprises an cylindrical outer filter cloth (33) which is provided in the outside of the filter cage (31), and an inner filter cloth (34) whose lower portion is combined with the inner circumference of the inner circumferential surface at the lower end of the outer filter cloth (33) so as to be opened and which is extended toward the venturi tube (35).

1 Claim, 4 Drawing Sheets

[Figure 1]
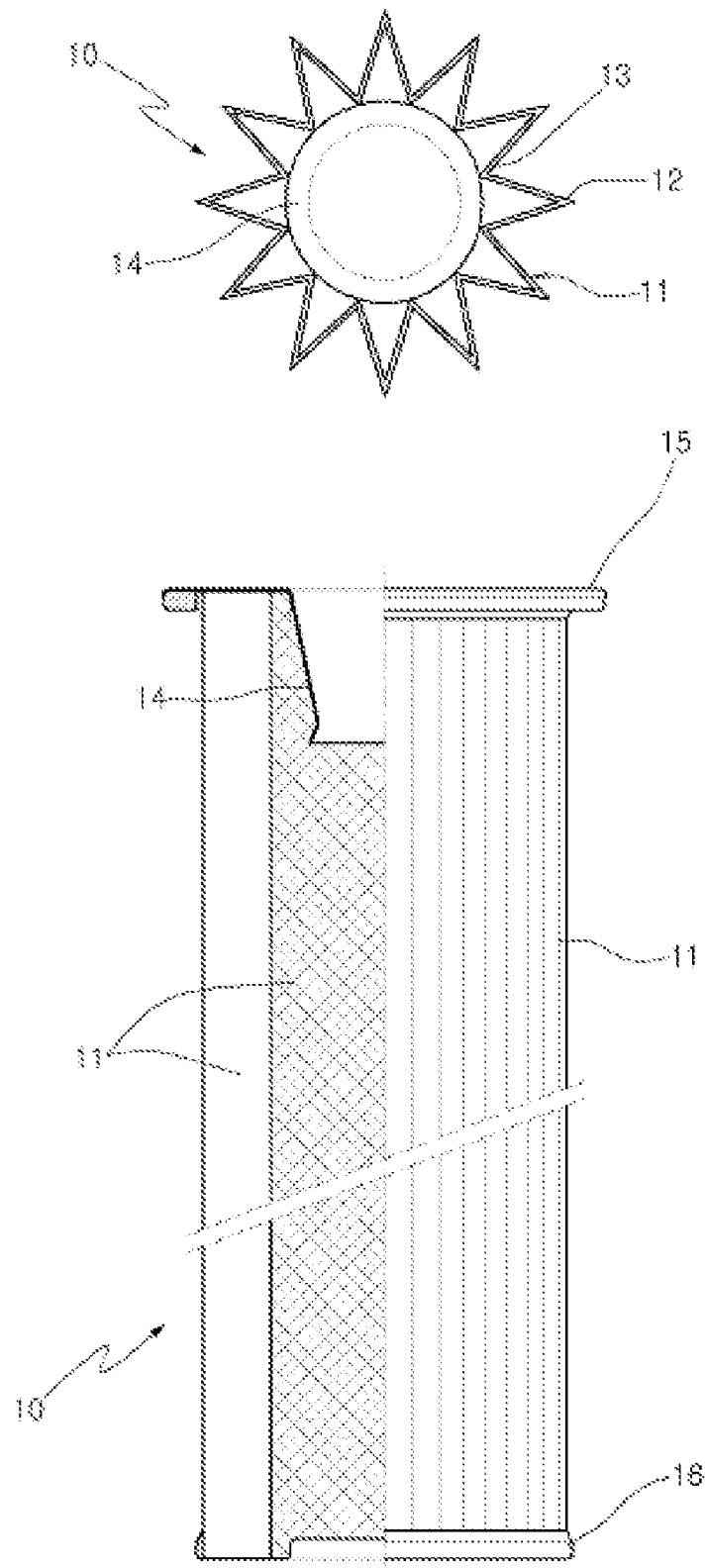

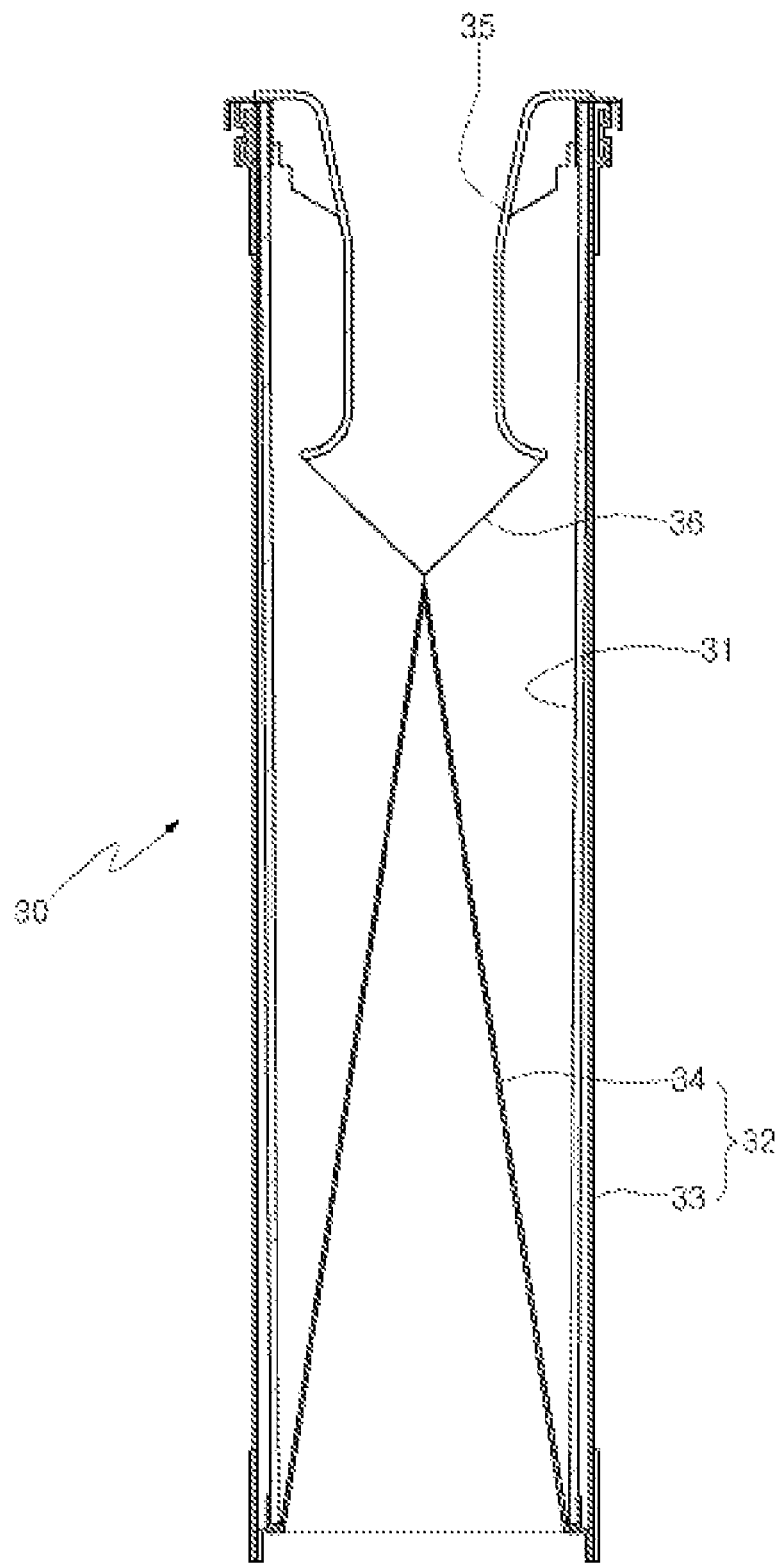
[Figure 2]

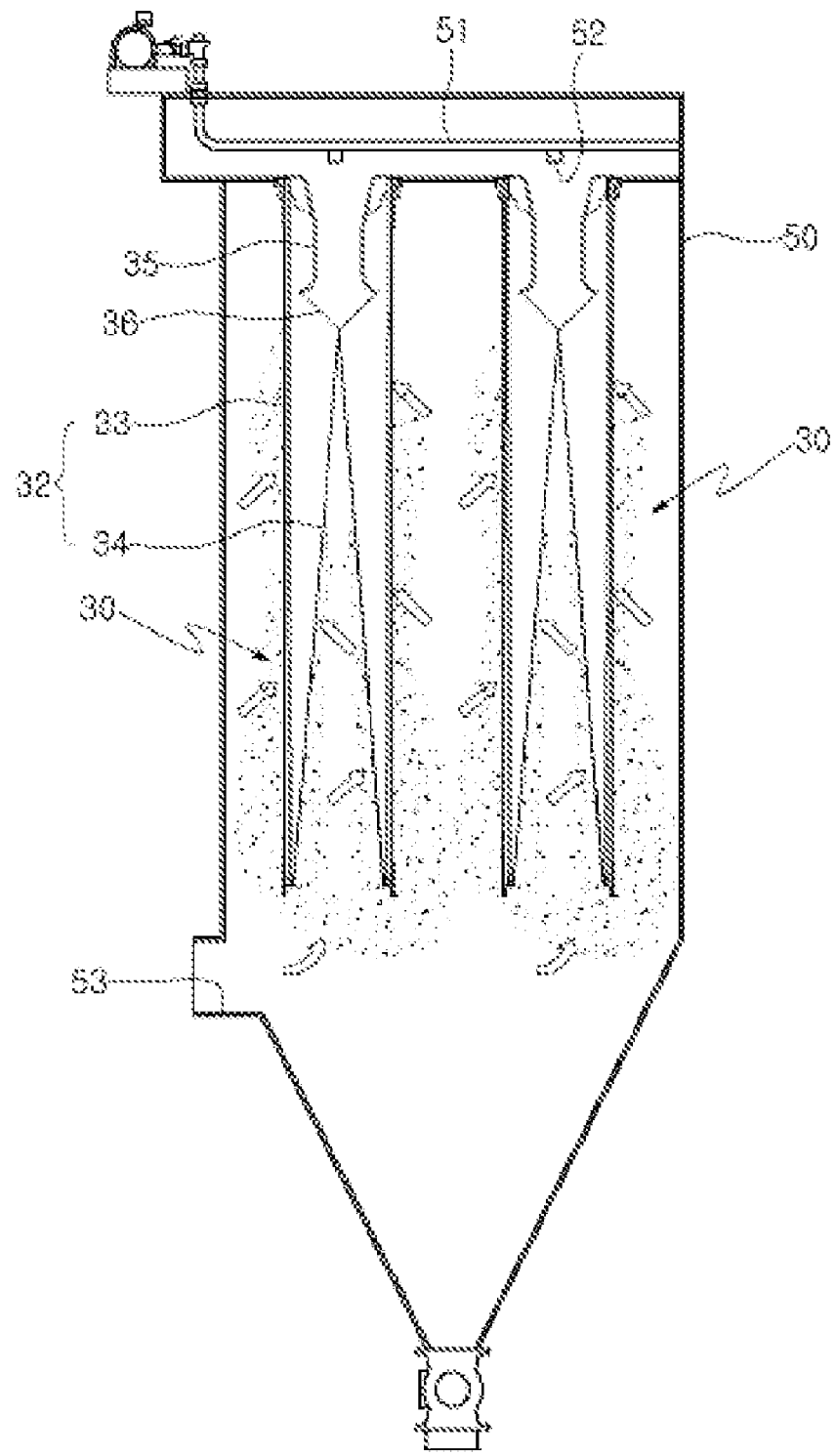
[Figure 3]

[Figure 4]
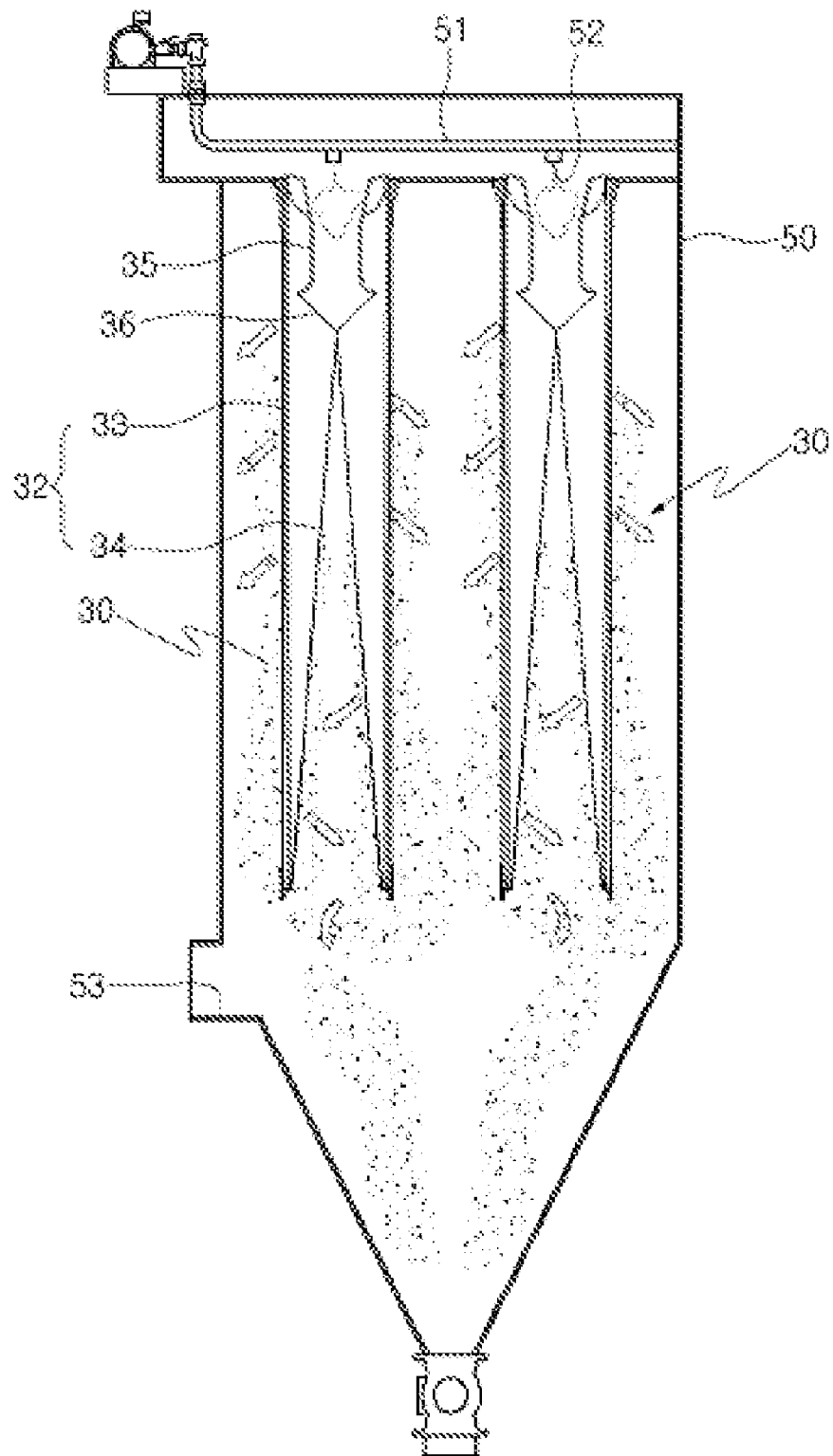

FILTER BAG FOR USE IN DUST COLLECTOR

TECHNICAL FIELD

The present invention relates to a filter bag for use in a dust collector, and more particularly, to a filter bag for use in a dust collector which increases a dust removal effect by increasing a filter area and distribution of an air pressure.

BACKGROUND ART

In general, dust collectors are essentially used to prevent environmental pollution by exhaust gas, fine particulate matter, industrial waste, etc., which are exhausted at the manufactories or factories of manufacturing or processing cement, fiber, chemical, metal, etc. A centrifugal force dust collector by cyclone or a filtration dust collector by a filter bag is chiefly used as the dust collector according to a dust collection method.

In particular, a dust collection capability and size and weight of a filtration dust collector are determined by a filter bag that is incorporated in the inside of the filtration dust collector. The filter bag is formed of an outer circumferential surface of a smooth cylindrical shape. Here, a number of filter bags are housed in the dust collector. The filter bag is made using a material such as polyester, polypropylene, nylon or DuPont's TEFLON™ products according to the chemical and physical properties, a service temperature, and features of a dust collection target. The number of incorporated filter bags is changed according to a desired filtering efficiency. As the numbers of filter bags becomes large, size of a dust collector becomes large, and thus a large facility area is needed. Accordingly, filter bags are manufactured to increase the surface area on the outer circumference in order to improve a filtering efficiency in the filter bag of an identical size. A bellows style filter bag will be described with reference to FIG. 1.

As shown in FIG. 1 a filter bag 10 includes a cylindrical filter cloth 11 of a bellows shape in which a number of peak portions 12 and dale portions 13 are formed in the lengthy direction on the outer circumferential surface of the filter bag 10. As shown in FIG. 1 the filter bag 10 includes upper and lower caps 15 and 16 which are adhered to the upper and lower portions of the filter cloth 11, respectively, to support the filter cloth 11, and a venturi tube 14 which is coupled on the upper end of the filter cloth 11 penetrating through the upper cap 15, and pressurizes an air pressure of air which spurts into the inside of the filter cloth 11.

Since the bellows style filter bag 10 having the above-described structure is formed of a relatively extensive surface area on which filtering can be done in comparison with a filter bag having an non-corrugated smooth surface on the filter cloth 11, it is known that a filter efficiency is increased. However, it is very troublesome to manufacture the bellows style filter bag 10 so as to form bellows or maintain the formed bellows to be kept consistently according to quality of the material of the filter cloth 11. Accordingly, a particular material such as polyester can be used as the filter cloth 11. As a result, there is a demerit that a dust collection target or a use place where the filter bag 10 can be used is limited. An example of limiting the dust collection target or the use place will be described. Since polyester is very weak chemically in alkalinity, it is not so good to use polyester in the place where alkaline particulate matters are exhausted. Meanwhile, polypropylene is strong in alkalinity, but is not difficult to form corrugation or maintain the formed corrugation continuously according to quality of the material. Accordingly, although polypropylene has several advantages in comparison with polyester, polypropylene has a limitation on manufacture that polypropylene is not easily used as the filter cloth 11 of the bellows style filter bag 10. When manufacturing the general filter bags having a smooth surface, a filter cage is provided in order to support a filter cloth, and the filter cloth is supported on the filter cage and sewn. Meanwhile, when manufacturing the bellows style filter bag 10, the filter cloth 11 is generally adhered to the upper and lower caps 15 and 16 by an adhesive since the bellows style filter bag 10 has the difficulty in sewing the filter cloth 11 onto the upper and lower caps 15 and 16 in view of feature in its shape of the bellows style filter bag 10. If the filter cloth 11 is adhered to the upper and lower caps 15 and 16 by the adhesive, the adhesion portion is very weak at a high temperature or in a damp place. For this reason, if the filter bag 10 is used under the high temperature or damp condition, life-time of the filter bag 10 is shortened. In addition, the mesh of the filter cloth 11 becomes relatively small at the corrugated dale portions 13 of the filter bag 10. Accordingly, a blinding phenomenon occurs by the dust, to thereby lower a dust collection efficiency. In the case that dust adhered on the surface of the filter cloth 11 is removed, a dust removal efficiency is lowered. Accordingly, the lifetime of the filter bag 10 is greatly shortened.

DISCLOSURE

Technical Problem

To solve the above problems, it is an object of the present invention to provide a filter bag for use in a dust collector which increases a filter area greatly even with a simple structure, and which makes size of the dust collector compact, to thereby reduce an installation area of the dust collector, and uniformly distributing an air pressure to thereby increase a dust removal effect as well as to enable a worker to easily manufacture the dust collector regardless of a quality of a material to thus provide a wide application range.

Technical Solution

To accomplish the above object of the present invention, according to an aspect of the present invention, there is provided a filter bag for use in a dust collector, the filter bag comprising a cylindrical filter cloth 32 which is supported by a filter cage 31, wherein the filter cloth 32 comprises an cylindrical outer filter cloth 33 which is provided in the outside of the filter cage 31, and an inner filter cloth 34 whose lower portion is attached to the lower end of the outer filter cloth 33 so as to be opened and which is extended upward in the filter cage 31, and the inner filter cloth 34 is formed of a cone whose diameter is reduced upwards.

According to still another feature of this invention, the filter bag for use in a dust collector further includes a venturi tube 35 which is combined with the upper end of the filter cage 31 and forms an air supply path so that pressurized air is supplied to the inside of the filter cloth 32, and a wire type fastener 36 that is attached to one side of the venturi tube 35 or the filter cage 31 at the inner leading end of the inner filter cloth 34, wherein the inner filter cloth 34 is supported by the wire type fastener 36.

Advantageous Effects

As described above, the present invention provides a filter bag for use in a dust collector includes an cylindrical outer filter cloth 33 which is provided in the outside of the filter cage 31, and a cone-shaped n inner filter cloth 34 whose lower portion is opened and which is attached to the lower end of the outer filter cloth 33. Thus, the collected surface area is greatly widened in comparison with the conventional art of the same size as that of the present invention, to thereby exert a high dust collection efficiency, as well as to thereby reduce the number of the filter bags 30 which are incorporated in the dust collector. As a result, the present invention provides an advantage of reducing size and weight of the dust collector and realizing a compact dust collector.

In addition, the present invention is of a relatively simple structure and can be easily manufactured in comparison with the conventional bellows style filter bag. Further, the present invention does not restrict a quality of a material of the filter cloth 32 into a specific material, to accordingly provide an advantage of widening a use range greatly.

In addition, the present invention may cause a less blinding phenomenon of a mesh in the dust collector, to thereby increase a dust collection efficiency and a dust removal efficiency. Further, lifetime of the filter bag according to the present invention is longer than that of the conventional art, and thus a replacement period of the filter bag 30 according to the present invention is longer than that of the conventional art, to thereby save a replacement cost of the filter bag 30.

Further, an air pressure of air which is sprayed into the filter bag 30 is uniformly distributed by the cone-shaped inner filter cloth 34 which is provided at the inner side of the filter bag 30, all over the whole filter bag 30. Thus, a uniform dust removal operation is achieved irrespective of length and position of the filter bag 30, to thereby greatly enhance a dust removal efficiency. A local damage of the filter bag due to the non-uniform of the air pressure may be prevented, to thereby provide a merit of extending lifetime of the filter bag.

Further, the fastener 36 that is combined with the leading end of the venturi tube 35 is extended at the inner leading end of the inner filter cloth 34, to thereby support the inner filter cloth 34. Accordingly, by this simple structure, the inner filter cloth 34 can be supported certainly without using a separate filter cage 31 for supporting the inner filter cloth 34. Moreover, since a separate filter cage 31 for supporting the inner filter cloth 34 is not used, the filter bag according to the present invention may provide advantages of removing a manufacturing cost rise factor, of being easily manufactured, and of having no prevention of an air pressure of air flowing through the venturi tube 35.

DESCRIPTION OF DRAWINGS

The above and/or other objects and/or advantages of the present invention will become more apparent by describing the preferred embodiments thereof in detail with reference to the accompanying drawings in which:

FIG. 1 is a top view of and a side view of an example of a conventional filter bag, respectively;

FIG. 2 is a cross-sectional view illustrating an example of a filter bag according to an embodiment of the present invention;

FIG. 3 is a cross-sectional view illustrating an operation state of a filter bag according to an embodiment of the present invention; and FIG. 4 is a cross-sectional view illustrating another operation state of the filter bag according to the embodiment of the present invention.

BEST MODE

Hereinbelow, a filter bag for use in a dust collector according to respective preferred embodiments of the present invention will be described with reference to the accompanying drawings. Like reference numerals denote like elements through the following embodiments.

FIG. 2 is a cross-sectional view illustrating an example of a filter bag according to an embodiment of the present invention. FIG. 3 is a cross-sectional view illustrating an operation state of a filter bag according to an embodiment of the present invention. FIG. 4 is a cross-sectional view illustrating another operation state of the filter bag according to the embodiment of the present invention.

As shown in FIG. 2, a filter bag 30 according to the present invention includes a filter cage 31 forming a frame so as to support a filter cloth 32. A cylindrical outer filter cloth 33 is provided at the outside of the filter cage 31. In addition, an inner filter cloth 34 that forms a cone shape is extended lengthily from the inner-lower circumference of the outer filter cloth 33. The venturi tube 35 which is combined with the filter cage 31 and inserted into the inside of the outer filter cloth 33 is provided at the upper end of the outer filter cloth 33. The filter bag for use in a dust collector according to the present invention having the above-described structure is similar to the conventional filter bag in its appearance, but the lower end of the filter bag 30 according to this invention is opened, and the filter bag 30 is formed of a cone shape in the lengthy direction thereof. Accordingly, even though the outer circumferential surface of the filter bag 30 is not corrugated differently from the conventional art, the surface area of the filter bag 30 can be greatly widened. As a result, the dust collection efficiency can be enhanced. In addition, the inner filter cloth 34 has not filter cage 31 by which the outer filter cloth 33 is supported. Thus, in order to support the inner filter cloth 34, a fastener 36 which is combined with the leading end of the venturi tube 35 is extended at the inner leading end of the inner filter cloth 34. The fastener 36 may be a wire. This type of fastener 36 supports the inner filter cloth 34 certainly, with a very simple structure, and provides an effect of having no prevention of the air pressure of air flowing through the venturi tube 35 as well as easily manufacturing the filter bag 30.

Hereinbelow, installation and operation of the filter bag 30 according to the present invention will follow in more detail. FIG. 3 illustrates a dust collection state, and FIG. 4 illustrates a dust removal state. At least one filter bag 30 is placed vertically in a hopper 50 of a dust collector. A blow pipe 51 is provided at the upper portion of the filter bag 30 so that air is sprayed into the inside of the filter bag 30. At least one spray nozzle 52 is formed on the blow pipe 51 so as to be proximate to the venturi tube 35 which is combined with the upper end of the filter bag 30. By this structure, dust flows into the inside of the hopper 50 through an inlet 53 which is formed at one side of the hopper 50, and the flown dust is collected by the filter bag 30 according to the present invention. Here, since dust is collected through the surface of the inner filter cloth 34 via the outer circumferential surface of the outer filter cloth 33 and the opened lower portion thereof, the collected surface area becomes greatly widened in comparison with that of the conventional filter bag of the same size as that of the present invention.

In addition, the dust which is adhered to the surfaces of the filter cloths 33 and 34 in the filter bag 30 during dust collecting, is removed by air which is supplied through the blower pipe 51, periodically or as necessary. The air which is sprayed from the spray nozzle 52 of the blower pipe 51 passes through the venturi tube 35. In this case, since the pressure is increased by a venturi effect, a high-pressure spray operation is achieved in the inside of the filter bag 30. Here, the venturi tube 35 is similar to the conventional art. In the conventional art, the inner portion of the filter bag is generally cylindrical, and thus the sprayed air pressure is decreased gradually from the venturi tube 35 to the lower end of the filter bag. Therefore, the air pressure of the inside of the filter bag is not uniform according to length of the filter bag. Accordingly, a dust removal operation is performed well at a position which is close to the venturi tube 35, but is not performed relatively well at a position which is close to the lower end of the filter bag. However, since the filter bag 30 according to the present invention includes the inner filter cloth 34 which is extended toward the venturi tube 35 and is formed of a cone shape, the inner portion of the filter bag 30 is reduced gradually along the lengthy direction of the filter bag 30 from the venturi tube 35. By the shape of the inner filter cloth 34, the air pressure of the inner portion of the filter bag 30 is entirely uniformly distributed. Accordingly, a uniform dust removal operation is achieved all over the whole filter bag 30.

MODE FOR INVENTION

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention provides a filter bag for use in a dust collector which increases a dust removal effect by increasing a filter area and distribution of an air pressure.

The invention claimed is:
1. A filter bag for use in a dust collector comprising:
   a filter cage;
   a cylindrical filter cloth which is supported by the filter cage and comprises an outer filter cloth and an inner filter cloth;
   a venturi tube which is engaged with the upper end of the filter cage and forms an air supply path so that pressurized air is supplied to the inside of the filter cloth; and
   a wire type fastener which engages the inner leading end of the inner filter cloth with one side of the venturi tube or the filter cage,
   wherein the outer filter cloth is provided in the outside of the filter cage, and
   wherein the inner filter cloth is provided in the inside of the filter cage and is formed of a cone the diameter of which becomes reduced upwardly such that the lower end of the inner filter cloth is attached to the lower end of the outer filter cloth so as to be opened.

* * * * *